United States Patent [19]

Frie et al.

[11] 4,185,966

[45] Jan. 29, 1980

[54] METHOD FOR OPERATING A REFORMED-GAS GENERATOR

[75] Inventors: Wolfgang Frie; Hans-Joachim Henkel, both of Erlangen, Fed. Rep. of Germany

[73] Assignee: Siemens Aktiengesellschaft, Munich, Fed. Rep. of Germany

[21] Appl. No.: 778,215

[22] Filed: Mar. 16, 1977

[30] Foreign Application Priority Data

Apr. 6, 1976 [DE] Fed. Rep. of Germany ....... 2614838

[51] Int. Cl.² .................. C10G 11/28; C01B 2/14; C01B 2/16
[52] U.S. Cl. .......................................... 48/212; 123/3; 252/373
[58] Field of Search ............... 48/212, 107, 197 R; 252/373; 123/3

[56] References Cited

U.S. PATENT DOCUMENTS

| | | | |
|---|---|---|---|
| 2,707,147 | 4/1955 | Shapleigh | 48/212 |
| 3,097,935 | 7/1963 | Steinhofer | 48/212 |
| 3,908,606 | 9/1975 | Toyoda et al. | 48/212 |
| 3,982,910 | 9/1976 | Houseman et al. | 48/212 |
| 3,984,210 | 10/1976 | Kostka | 48/212 |

FOREIGN PATENT DOCUMENTS 2306026 8/1974 Fed. Rep. of Germany .............. 123/3

*Primary Examiner*—S. Leon Bashore
*Assistant Examiner*—Peter F. Kratz
*Attorney, Agent, or Firm*—Kenyon & Kenyon

[57] ABSTRACT

In a reformed gas generator, where evaporated or atomized liquid higher hydrocarbons are reacted with an oxygen containing gas at elevated temperature to form a gas mixture containing methane, carbon monoxide and/or hydrogen, and wherein the reactants to be converted may be heated, if desired, to an elevated input temperature before they are conducted into the reformed gas generator, with throughput of reactants variable; and the air number of the oxygen containing gas between 0.05 and 0.2, a gas containing the oxygen only in free form is used, no external heat is supplied to the reformed-gas generator, and, with changing throughput, the air number and/or the input temperature is controlled so that the degree of conversion of the hydrocarbons is between 60 and 95% to give a method particularly well suited to operate an internal combustion engine with the generated reformed gas.

10 Claims, 4 Drawing Figures

METHOD FOR OPERATING A REFORMED-GAS GENERATOR

BACKGROUND OF THE INVENTION

The invention relates to reformed gas generators in general and more particularly to an improved method of operating a reformed gas generator.

Such reformed gas generators in which evaporated or atomized liquid higher hydrocarbons are reacted at elevated temperature with an oxygen containing gas to form a gas mixture containing methane, carbon monoxide and/or hydrogen, wherein the reactants to be converted are heated, if desired, to an elevated input temperature before they are conducted into the reformed-gas generator are known. The throughput of the reactants is variable and the air number $\lambda$ of the gas containing the free oxygen is generally between 0.05 and 0.2.

In what are known as reformed gas generators, atomized, evaporated or vaporized liquid hydrocarbons are reacted with an oxygen containing gas at elevated temperature to form a fuel gas (reformed gas) containing carbon monoxide, methane and/or hydrogen. For instance, air, which contains the oxygen in free form, or exhaust gas which contains the oxygen in bound form ($CO_2$ and $H_2O$) may be used as the oxygen containing gas. The reformed gas generated can be used as a synthesis gas or a reduction gas in metallurgical processes. In particular, it can be mixed with combustion air and serve as a fuel gas for burners and internal combustion engines. Whereas, with unpretreated liquid fuel the incomplete evaporation of the fuel and the nonuniform mixing with combustion air lead to incomplete combustion and to the emission of harmful substances, the reformed gas can be better mixed with the combustion air and be burned largely without residue. Since it also has a high octane number, the addition of antiknock agents to the fuel is not needed for operating internal combustion engines, so that the content of health injurious substances in the exhaust gas is further lowered.

The reaction of hydrocarbons with air is an exothermic partial oxidation with low air numbers. The air number $\lambda$ is understood here to be the ratio of the air used for the oxidation to the quantity of air which would be required for a stoichiometric combustion of the hydrocarbons. The air number is kept low so that as little chemical energy as possible is used in the conversion and the calorific value of the fuel gas is not substantially reduced. Bound oxygen e.g. exhaust gas, can also be used as the oxygen carrier, in which case, however, the hydrocarbon is reacted endothermically and heat must be supplied to the generator. This increases the calorific value of the fuel gas produced.

A difficulty arises in that the generated reformed gas at thermodynamic equilibrium contains the hydrocarbon in part in the form of soot and coking products. Such soot, however substantially degrades the combustion of the reformed gas and leads in addition, to clogging of lines and valves, especially when used in internal combustion engines.

Catalysts have already been developed which catalyze endothermic as well as exothermic conversion reactions and lead, under suitable laboratory conditions, to soot-free fuel gas. Such catalysts are described, for instance, in U.S. application Ser. No. 585,398 now U.S. Pat. No. 3,984,210.

In U.S. application Ser. No. 439,870 now abandoned in favor of U.S. application Ser. No. 633,609, now U.S. Pat. No. 4,121,542 operating an internal combustion engine with a reformed gas generator is also described. A mixture of hydrocarbon containing fuel and a primary oxygen containing gas is converted into a fuel gas in the reformed gas generator. This fuel gas is then drawn, mixed with combustion air, into the combustion chambers of the internal combustion engine by the suction of the latter. The amount of the fuel conducted into the reformed gas generator is controlled approximately proportional to the respective demand of the internal combustion engine. Air can be used as the primary oxygen containing gas, the air number being between 0.05 and 0.5 and preferably not more than 0.2. The air can be replaced, however, entirely or partially, by exhaust gas. The reaction temperature at the catalysts of the reformed gas generator can then be controlled by controlling the mass ratio of the air to the exhaust gas, where a stronger exothermic reaction and thus a higher reaction temperature corresponds to a larger share of air. Provision is made for heating the reactants to be converted to an input temperature as high as possible before they are conducted into the reformed gas generator itself. The heat required therefor is transferred, by means of heat exchangers, from the hot exhaust gas of the internal combustion engine. This should permit an endothermic reation of the fuel with exhaust gas which is as far reaching as possible and which leads to a conversion of the waste heat of the exhaust gas into the chemical energy of the fuel gas.

According to the operating conditions of the reformed gas generator used, the quality of the reformed gas produced is different even if one and the same catalyst is used. If a mixture of hydrocarbons and air is fed into a reactor in such a manner that the input temperature of the mixture, the air number and the throughput are held constant or are varied only slowly, and if the reaction chamber is carefully heated to a constant temperature by supplying external heat, reformed gas without soot can be generated, and the degree of conversion of the hydrocarbons can be increased with increasing reaction temperature, increasing input temperature and dropping throughput practically up to complete conversion. In the method described in U.S. application Ser. No. 439,870 now abandoned in favor of U.S. application Ser. No. 633,609, however, the throughput varies rapidly in accordance with the demand of the internal combustion engine and a changing amount of hot fuel gas is presented to the heat exchangers which heat the reactants and the reaction chamber, and which have a certain intrinsic inertia. The input temperature of the reactants and the reaction temperature in the reaction chamber are thus subjected to rapid fluctuations. The quality of the reformed gas produced also differs accordingly and the generation of soot cannot be precluded or only precluded by a fast acting, elaborate control system.

SUMMARY OF THE INVENTION

It is an object of the present invention to provide an operationally reliable method of operating a reformed gas generator which require a minimum of control means and in which liquid hydrocarbons can be converted into soot free reformed gas.

According to the present invention, this is achieved by a method of the type indicated at the outset, i.e. the type disclosed in U.S. application Ser. No. 633,609, the disclosure of which is hereby incorporated by reference, in which a gas which contains the oxygen only in free form is used; no external heat is supplied to the reformed gas generator; and the air number λ and/or the input temperature are controlled in such a manner that if the throughput is changed, the degree of conversion of the hydrocarbons is between 60 and 95%.

The degree of conversion of the reaction of liquid hydrocarbons is understood here to be the percentage of the hydrocarbons used which has been converted into methane, carbon monoxide and/or hydrogen as well as possibly also into carbon dioxide, water vapor and low hydrocarbons with two to five carbon atoms per molecule.

The degree of conversion can be controlled in such a manner that an increase of the degree of conversion is counteracted by lowering the input temperature, with the air number being held constant. However, the input temperature can be lowered and the air number increased at the same time. Conversely, a dropping of the degree of conversion is counteracted by increasing the input temperature, with the air number constant, or by increasing the input temperature and simultaneously decreasing the air number.

In the method according to the present invention, the use of exhaust gas as the oxygen containing gas for the reaction is therefore dispensed with. Consequently, only an exothermic reaction takes place and the possibility of controlling the reaction temperature by varying the heat balance of the reaction by the admixture of exhaust gas no longer exists. Also external heating of the reaction chamber, for instance, by utilizing the exhaust gas heat, is dispensed with. However, the means required for the temperature control are simplified thereby, since, for instance, a separate temperature sensor for determining the reaction temperature in the reaction chamber is no longer necessary. As will be shown later, a favorable reaction temperature adjust itself automatically in the reaction chamber, and the formation of soot in the reaction is also prevented.

The method according to the present invention is suited for thermal, i.e., non-catalytic, reactions of higher hydrocarbons, e.g., hydrocarbons with four or more carbon atoms, with a gas containing free oxygen (e.g., air), as well as for catalytic reactions. The degree of conversion is advantageously in particular between 75 and 90%.

With the method according to the present invention, the input temperature may be between the ambient temperature and the reaction temperature, but it is advantageously between 200° and 450° C. At these temperatures, many of the hydrocarbons used as fuel are already present in vapor form, but do not yet react with air. A vaporous, not yet reactive mixture is therefore introduced into the reaction chamber.

The limits, within which the input temperature and the air number λ can be varied, without the degree of conversion leaving the prescribed range, depend on the kind of hydrocarbons used and the catalyst employed (e.g., on the activity and the volume) and can be determined experimentally.

In the operation of a reformed gas generator to which no external heat is supplied, the three parameters, throughput of the hydrocarbons, air number and input temperature of the reactants, can be varied independently of each other. Through this variation, one can plot experimentally a three dimensional performance graph, in which a definite operating state with an experimentally determinable degree of conversion corresponds to each point of the performance graph. A region of the three dimensional performance graph which is bounded by the conditions that the air number is between 0.05 and 0.2 and the degree of conversion between 60 and 95% then corresponds to the method according to the invention.

In this condition, a method is advantageous, in which the input temperature and/or the air number are controlled as a function of the throughput of the hydrocarbons. This control is preferably performed in such a manner that the degree of conversion is held approximately constant. This can be accomplished by reducing the air number λ with increasing throughput, while the input temperature is constant, and increasing the air number with decreasing throughput. However, it may also be advantageous to increase the input temperature with increasing throughput, while the air number λ is constant, or to lower the input temperature with decreasing throughput.

It may be also advantageous, however, to conduct the method in such a manner that the air number and/or the input temperature are controlled as a function of the throughput and the reaction temperature. This variant of the method is often easier to realize in practice, since the reaction temperature in the reaction chamber is more easily accessible for measurement than the degree of conversion. The reaction temperature is advantageously between 700° and 850° C. This possibility follows from the fact that an unequivocal, experimentally determinable relation exists between the degree of conversion and the reaction temperature. It is advantageous in this connection to keep the reaction temperature constant, at least as long as the throughput remains within a part of the region permitted for the throughput. Then, the air number λ can advantageously be increased or decreased as the reaction temperature in the gas generator falls or rises, respectively.

The control law, according to which the input temperatures and the air numbers are controlled in the operation of the reformed gas generator in accordance with the throughput, can be determined by finding in the above-mentioned three dimensional performance graph, for each throughput, that input temperature and air number, for which the reaction proceeds under the corresponding secondary conditions (constant degree of conversion and/or constant reaction temperature). If the control law is determined experimentally for a reformed gas generator of a given type, then all reformed gas generators of this type can be operated in accordance with this control law.

To realize the control law in the operation of an internal combustion engine with a reformed gas generators, one can proceed so as to determine from operating data of the internal combustion engine (e.g., from the torque and the speed of rotation) the instantaneous fuel consumption and thus the amount of hydrocarbons to be converted. The control law for the reformed gas generator then furnishes the air number and the input temperature. A throttle in the air intake of the reformed gas generator can be used to adjust the air number; the corresponding input temperature can be obtained, for instance, by heat exchangers heated with exhaust gas, in which sufficient cold secondary air is admixed to the hot exhaust gas via a bypass that the reactants are heated in the heat exhanber to the desired temperature. Then, only one control is still required which uses as its input variable the operating data of the internal combustion engine and furnishes as its output variable control signals for the fuel supply, the throttle and the bypass.

In the method according to the present invention, condensate produced in the generated gas mixture can advantageously be returned to the reformed gas generator. This condensate may contain unreacted hydrocarbons or higher molecular, i.e., liquid, dissociation products. The condensate is considered to be part of the hydrocarbons to be converted, i.e., the input temperature of the reactants refers to the mean temperature of the mixture of oxygen containing gas, returned condensate and the hydrocarbons used. Likewise, the degree of conversion refers to the total quantity of hydrocarbons used and returned.

DETAILED DESCRIPTION OF THE INVENTION

For a better understanding of the present invention, the understoichiometric reaction of hydrocarbons with air will be examined in detail.

Figure 1:
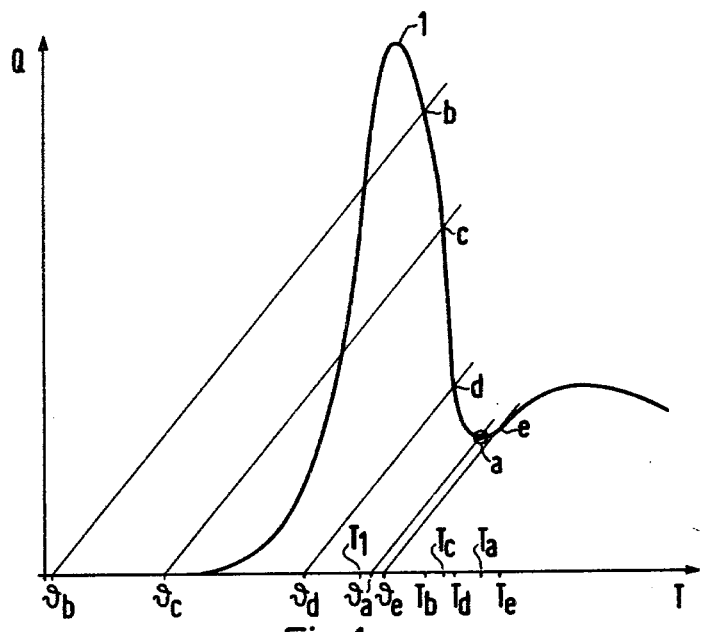
FIG. 1 is a curve illustrating the dependence of the reaction heat $Q_R$ on the reaction temperature T.

At low temperatures, the dissociation of the hydrocarbons proceeds exothermically and yields, besides other dissociation products, $CO_2$, $H_2O$ and $CH_4$. At higher temperatures, endothermic reactions set in, which lead to the formation of CO, $H_2$, $CH_4$ and hydrocarbons with two to five C-atoms. Upon increasing the temperature further, an exothermic decomposition of the hydrocarbons into soot sets in. In FIG. 1, the dependence of the reaction heat $Q_R$ on the reaction temperature T is shown by curve 1. With increasing temperature, the exothermic formation of $CO_2$ and $H_2O$ at first causes a steep rise and the endothermic reactions subsequently cause a steep drop of the reaction heat curve, which then rises again in the region of the exothermic soot formation.

A constant operating point of the reformed gas generator will be present, if the heat $Q_R$ produced by the reaction is equal to the heat $Q_E$ which is required to heat the reactants entering the reaction chamber with the input temperature $\zeta_E$ to the reaction temperature $T_R$. If the specific heat of the reactants is designated with $C_E$, we must therefore have for a stable operating point:

$$Q_R = Q_E = C_E \cdot (T_R - \zeta_E).$$

It is assumed here that the reaction proceeds approximately adiabatically, i.e., that neither external heat is supplied nor substantial heat losses occur. If the reaction heat produced is larger than is required for heating the reactants, then the temperature in the reaction chamber increases, but if it is lower, it drops. These temperature changes ultimately lead to a stable operating point, at which we have $Q_R = Q_E$.

In FIG. 1 is further plotted for different input temperatures $\zeta_a, \zeta_b, \ldots \zeta_e$ the quantity $Q_E = C_E \cdot (T_R - \zeta_E)$ as a function of the reaction temperature. Approximately linear curves are obtained. The intersection points a, b, ..., e of these straight lines with the curve 1 correspond to respective stable operating conditions for an adiabatic reaction. The corresponding reaction temperatures are designated $T_a, T_b, \ldots, T_e$.

It is evident that, for instance, at an input temperature $\zeta_b$ and a reaction temperature below $T_1$, $Q_R < Q_E$. A gas generator could therefore be operated at such temperatures only if the heat required to heat up the reactants were supplied to the reaction chamber from the outside; otherwise, the reaction stops. For reaction temperatures above $T_b$, we have likewise $Q_R < Q_E$; if no external heat is supplied to the reaction chamber, the reaction temperature drops to the value $T_b$. However, if the reaction takes place at temperatures between $T_1$ and $T_b$, then we have $Q_R > Q_E$; in this case, the reaction tempertures rises until it reaches the value $T_b$. The case of the operating point b is therefore a "self-stabilizing state", to which the system regulates itself at the input temperature $\zeta_b$. There is no danger of the reaction stopping.

It is seen from FIG. 1 in particular that even with large fluctuations of the input temperature, the reaction temperature is subject only to minor changes.

The input temperatures $\zeta_b, \zeta_c, \zeta_d$, and $\zeta_e$ are chosen so that at the corresponding stable operating temperatures $T_b, T_c, T_d$ and $T_e$, the degree of conversion of the hydrocarbons is 70, 80, 90 and 99%. One can therefore obtain an increase in the degree of conversion by increasing the input temperature or by increasing the reaction temperature (which is automatically equivalent therewith for an adiabatic reaction). At the temperature $T_a$, to which a point a corresponds which almost coincides with a relative minimum on the reaction heat curve 1, soot formation sets in, however. To generate reformed gas free of soot, it is therefore necessary that the degree of conversion does not exceed a certain maximum vlaue. In particular, a reaction temperature which is above the temperature $T_a$, leads to the formation of soot. Such an increased reaction temperature would occur, for instance, if the input temperature is chosen higher than $\zeta_a$ or if too much external heat is supplied to the reaction chamber.

Since the different dissociation reactions proceed with different speeds at different cayalysts, the exact shape of curve 1 depends on the type of catalyst used as well as on that of the hydrocarbons used. The model investigations described here which concern the reaction of heptane at a catalyst which catalyses endothermic as well as exothermic reactions, would seem to be applicable, however, to dissociation reaction in general, even to non-catalytic thermal dissociation.

Figure 2:
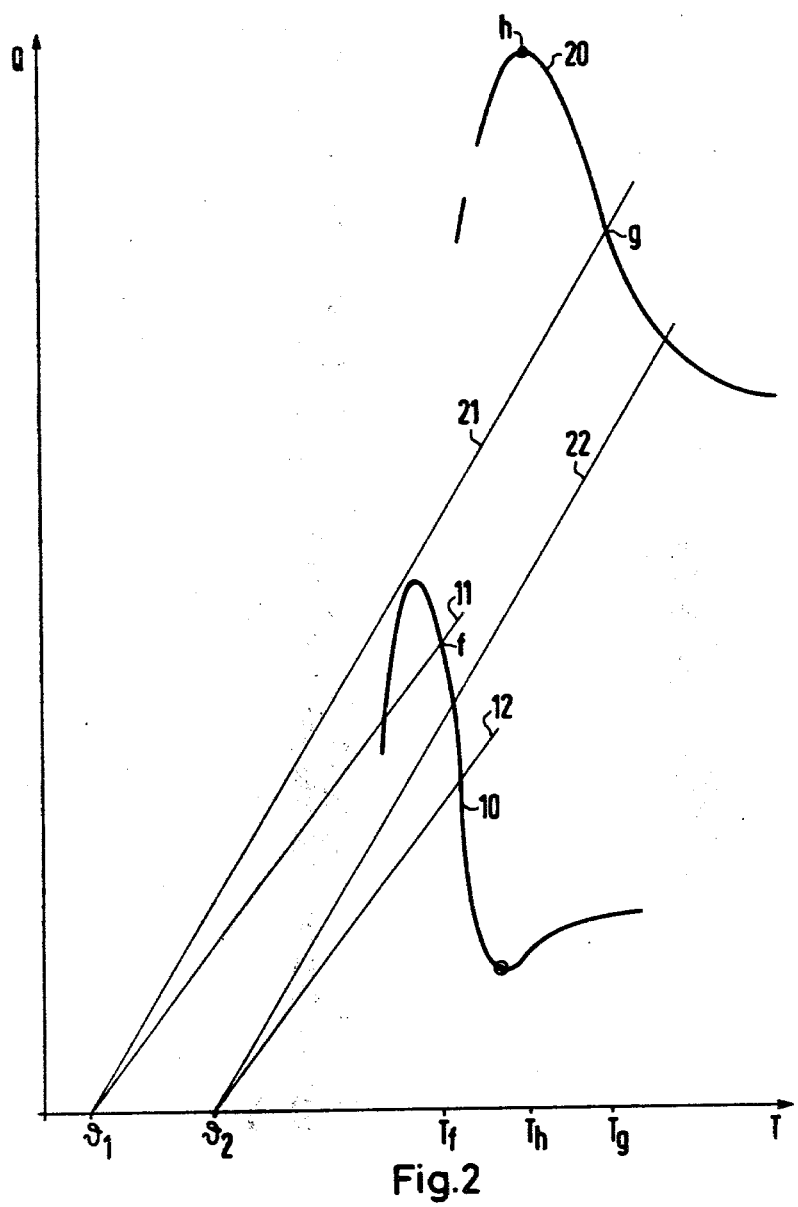
FIG. 2 contains curve illustrating the same relationship as FIG. 1 for air numbers of 0.1 and 0.2.

FIG. 2 illustrates the reaction heat curves for a reaction with the air number $\zeta = 0.1$ (curve 10) and a reaction with $\zeta = 0.2$ (curve 20), only that part of the curves being shown on which stable operating points are located and which are therefore accessible for experimental measurements. At the same time, the heat $Q_E = C_E \cdot (T - \zeta_E)$ which must be absorbed by the reactants entering the reaction chamber with the temperature $\zeta$ as they are heated to the temperature T is entered in the figure. Since with doubling the air number, twice the amount of air must also be heated up, besides the hydrocarbon, the $Q_E$ curve 21 starting out from $\zeta_1$ for $\lambda = 0.2$ has a greater slope than curve 11 for $\lambda = 0.1$. Similar curves 22 and 12 start out from $\zeta_2$. With a fixed throughput of the hydrocarbons, a stable operating point f, which is given by the intersection of the curves 10 and 11 and to which the reaction temperature $T_f$ corresponds, therefore corresponds to an input temperature $\zeta_1$ and an air number $\lambda = 0.1$. For $\lambda = 0.2$, on the other hand, the stable operating point g is obtained at the intersection of the curves 20 and 21, and the corresponding reaction emperature $T_g$ is above the temperature $T_f$. It can further be seen from the figure that stable operating states exist on the curve 20 only for temperatures above $T_h$, but that operating state on the curve 10 which are accompanied by the formation of soot correspond to these temperatures. From this, the conclusion is drawn that a reformed gas generator, in the operation of which the input temperature is kept constant but the air number is varied, can have a tendency to form soot. The formation of soot occurs in particular if the degree of conversion has exceeded a certain maximum value characteristic for the specific gas generator.

Figure 3:
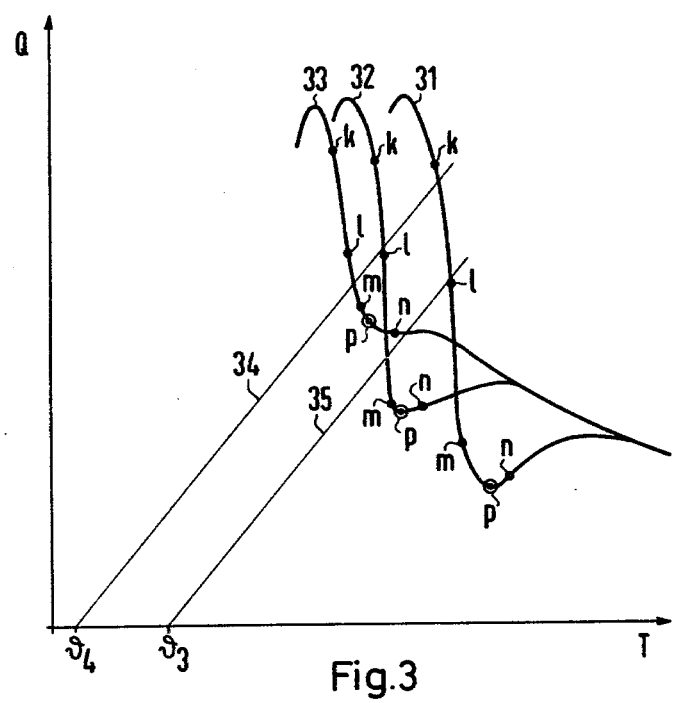
FIG. 3 illustrates the same relationships as FIG. 1 on a series of curves which show the effect of throughput.

In FIG. 3, the conditions which are obtained if the throughput is changed, with the air number constant, are shown. Curve 31 corresponds to curve 1 shown in FIG. 1. Curves 32 and 33 correspond to a reduction of the throughput by a factor 2.5 and 10, respectively.

The point k designates the respective operating states which correspond to a conversion of 70%. The points designated with l, m and n correspond to the respective straight conversion lines of 80, 90 and 99%. The points designate the operating points at which the formation of soot occurs. With a fixed air number, a decrease of the throughput (transition from curve 31 to curve 33) has the effect that, with the input temperature fixed, the degree of conversion increases. In order to obtain a constant degree of conversion, the input temperature must also, on the other hand, be chosen lower with decreasing throughput. Attention must be paid to this particularly if heat exchangers, by means of which the reactants are heated up before they are conducted into the reaction chamber, are used. For, with decreasing throughput, the dwelling time of the reactants in the heat exchangers increases, so that their temperature rises, unless suitable countermeasures are taken.

It is further seen that with the air number $\lambda=0.08$ chosen here, an input temperature $\zeta_3$ leads, with a large throughput, to a degree of conversion which is obtained from the intersection of the curve 31 with the straight line 35 and is at about 80%. Now, with decreasing throughput, the degree of conversion increases as follows from the intersection of the curve 32, but with a minimal throughput, the intersection with the curve 33 is already beyond the soot limit. In order to avoid the formation of soot, one must in this case, i.e., with the air number $\lambda$ fixed, also lower the input temperature with decreasing throughput. At an input temperature $\zeta_4$, one then arrives again at an operating point which ensures freedom from soot (intersection of the straight line 34 with the curve 33).

Figure 4:
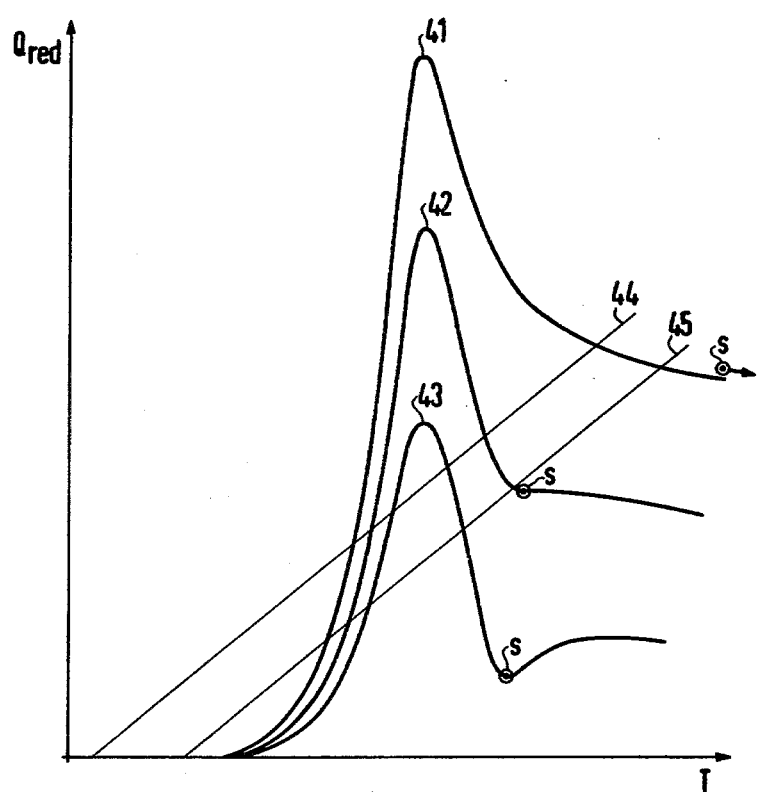
FIG. 4 is a series of similar curves illustrating the effects of varying througput and air number.

One can also vary the air number with a variation of the throughput. FIG. 4 shows the reaction heat curves which are obtained with the throughputs of FIG. 3. Since the amounts of heat $Q_E$ which must be absorbed by the input substances in order to be heated also change if the throughput changes, the reaction heats are given, for the sake of greater clarity, as normalized reaction heats i.e., they are divided by a factor which is dependent on the throughput and is chosen so that the $Q_E$ curves starting from a common input temperature coincide for all throughputs.

Curve 43 corresponds to curve 33, curve 42 to curve 32 but with about twice the air number, and curve 41 to curve 31 but with about three times the air number. The exact values of the air numbers were chosen so that the maxima of the reaction heat occur at the same temperature. The points correspond to the points at which soot formation set in.

Curve 41 is obtained with the air number $\lambda=0.25$, which is outside the method according to the invention. Its decline is less steep than that of the curves 42 and 43 and the intersections with the straight lines 44 and 45 correspond to undesirably high reaction temperatures and low degrees of conversion.

To find a suitable control law for the operation of the reformed gas generator, one can, for instance, look up for every throughput the air number $\lambda$, at which a reaction temperature of about 800° C. results for a predetermined mean input temperature. Subsequently, the input temperature is changed so that a degree of conversion adjusts itself which is on the one hand as large as possible but, on the other hand, still has a sufficient margin of safety from the point at which soot formation sets in. Only a slight shift in the reaction temperature is obtained. If necessary, the air number $\lambda$ can only be readjusted, so that a degree of conversion within the prescribed range is achieved.

On the whole, one will strive for low air numbers and high input temperatures in order to achieve low consumption of chemical energy; in addition, large degrees of conversion are often desired in order to convert the hydrocarbons as far as possible into the high grade fuel gas mixture. In the operation of internal combustion engines, a low reaction temperature, for instance, is advantageous in addition, since the degree of cylinder filling in the combustion chambers of the engine improves with decreasing temperature of the mixture and the mixture must therefore be cooled down after it leaves the reformed gas generator. Which one of the individual variants of the method according to the invention is the most advantageous, will depend on the respective catalyst used, the hydrocarbons used and the intended purpose.

The present invention will now be explained in further detail with the aid of two examples.

In these examples, a motor vehicle engine is operated with fuel gas (reformed gas) generated in a reformed gas generator. As the hydrocarbon containing fuel what is known as base gasoline, a crude oil distillate with a boiling range of 40° to 200° C. which was subjected to no processing steps other than distillation, is used. Its octane number (ROZ) is about 40 to 60 and its aromatics content between 10 and 15%. The reaction chamber of the reformed gas generator used for the conversion has a diameter of about 10 cm and is filled with 400 cm³ of a cracking catalyst which contains, on a carrier of aluminum oxide, an active component of 0.6% iron, 0.5% chromium and 1.4% molybdenum. Such a catalyst is described in U.S. application Ser. No. 585,398 as the last example.

A passenger car of the medium size class takes between 1 liter of gasoline per hour when idling to 20 liters of gasoline per hour at full load.

In the method according to the present invention, external heating of the reaction chamber is dispensed with and the air number and the input temperature are controlled as function of the throughput in such a manner that the reactor is always run in the region of the self stabilizing operating states, i.e., at degrees of conversion between 60 and 95%. With these degrees of conversion, the reformed gas generator is protected both against goint out and against overheating. These degrees of conversion further provide sufficient protection against the formation of soot which occurs only at still higher degrees of conversion or at high temperatures.

A throughput of 20 liters per hour in the reformed gas generator corresponds to a throughput of 50 liters per hour and 1 catalyst volume, i.e., 20 1/0.41=50, designated as 50 V/Vh in the following. For heavier engines which require higher throughputs, the catalytic charge of the reactor must be apportioned so that the catalyst loading given in V/Vh remains in these ranges.

EXAMPLE 1

In the first example, the input temperature is first fixed at 400° C. with the largest throughput expected i.e., 50 V/Vh and the air number is chosen so that a reaction temperature of 800° C. adjusts itself in the reaction chamber. This can be achieved with an air number of $\lambda=0.08$, the conversion being about 75%. Even for fluctuations of the input temperature of more than 100° C., fluctuations of the reaction temperature of only ±10° C. take place. With decreasing throughput, the air number is now raised steadily with the input temperature being kept constant, until it reaches the value $\lambda=0.1$ at a throughput of 12.5 V/Vh. The degree of conversion rises to about 85% and the reaction temperature remains at about 800° C.

With further decreasing throughput, the air number is raised further, until it reaches the value 0.15 at 2.5 V/Vh. An input temperature of 400° C., however, would correspond to an operation, the operating points of which no longer lie on the steeply declining part of the reaction heat curve. The degree of conversion and the reaction temperature would increase more than permissible, and heavy soot formation would be unavoidable. Therefore, the input temperature is lowered for loadings below 12.5 V/Vh until it is at about 200° C. for 2.5 V/Vh. Thus, the degree of conversion with values between 90 and 95% still remains in the permissible range and development of soot is avoided with certainty.

EXAMPLE 2

In a second example, the reformed gas generator is operated at a maximum catalyst loading of 50 V/Vh with an air number of 0.08 and an input temperature of 400° C. as in the first example, the reaction temperature being about 800° C. and the degree of conversion about 75%. If the throughput is reduced down to 12.5 V/Vh, the input temperature is now lowered to 200° C. with $\lambda$ constant. The reaction temperature drops to 700° C., and the conversion is increased to about 80%. With a further reduction of the throughput to 2.5 V/Vh, the input temperature of 200° C. (the lowest input temperature at which the base gasoline used is present in evaporated form) is maintained and the air number increased to 0.15. Thereby, the reaction temperature in the reaction chamber rises again to 800° C.

In order to still obtain, at degrees of conversion of 75% and lower, a sufficiently high octane number of the fuel gas to be fed to the internal combustion engine, it is possible to feed to the internal combustion engine not the entire mixture of converted and unconverted hydrocarbons, leaving the reformed gas generator but instead to cool down the reformed gas and to admix the condensate which is precipitated in the process and contains, besides unreacted hydrocarbons and liquid dissociation products, also slight amounts of water and has a low octane number, to the gasoline used.

However, in order to ensure a high octane number of the reformed gas produced, a variant of the method may also be used, in which the degree of conversion is kept constant, for instance, at a degree of conversion of 90%, through simultaneously changing the air number and the input temperatures.

The types of apparatus which may be used to control input temperatures and air number are described in detail in the aforementioned U.S. application Ser. No. 633,609.

What is claimed is:

1. A method for operating a reformed gas generator, in which evaporated or atomized liquid higher hydrocarbons are reacted at an elevated temperature with an oxygen containing gas to form a soot free gas mixture containing methane, carbon monoxide and/or hydrogen, wherein the reactants to be converted are heated to an increased input temperature before they are conducted into the reformed gas generator; the throughput of the reactants is variable; and the air number $\lambda$ of the oxygen containing gas is maintained between 0.05 and 0.2, in which the improvement comprises using as the oxygen containing gas only as gas containing the oxygen only in free form; supplying no external heat to the reformed gas generator except heat, which is supplied to the reactants before their input to the reformed gas generator; and controlling at least one of the air number and input temperature, as a function of changing throughput of the hydrocarbons, in such a manner that the degree of conversion of the hydrocarbons is between 60 and 95% whereby a reaction temperature of between 700° C. and 850° C. will adjust itself without a supply of a gas containing oxygen in bound form.

2. The method according to claim 1, wherein the hydrocarbons are reacted catalytically.

3. The method according to claim 1, wherein the degree of conversion is held between 75 and 90%.

4. The method according to claim 1, wherein the input temperature is held between 200° and 450° C.

5. The method according to claim 1, wherein the degree of conversion is held approximately constant.

6. The method according to claim 1, wherein the input temperature is held constant and the air number is reduced or raised, respectively with rising or falling hydrocarbon throughput.

7. The method according to claim 1, wherein the input temperature is raised or lowered, respectively, with the air number $\lambda$ being kept constant with rising or falling hydrocarbon throughput.

8. The method according to one of the claim 1, wherein at least one of the air number and the input temperature are controlled as a function of the hydrocarbon throughput and the reaction temperature.

9. The method according to claim 8, wherein the air number $\lambda$ is increased and decreased when the reaction temperature drops and rises, respectively.

10. The method according to claim 1 and further including returning condensate produced in the generated gas mixture into the reformed gas generator.

* * * * *